April 8, 1952 W. H. SPECK 2,592,352
VALVE
Filed May 2, 1946
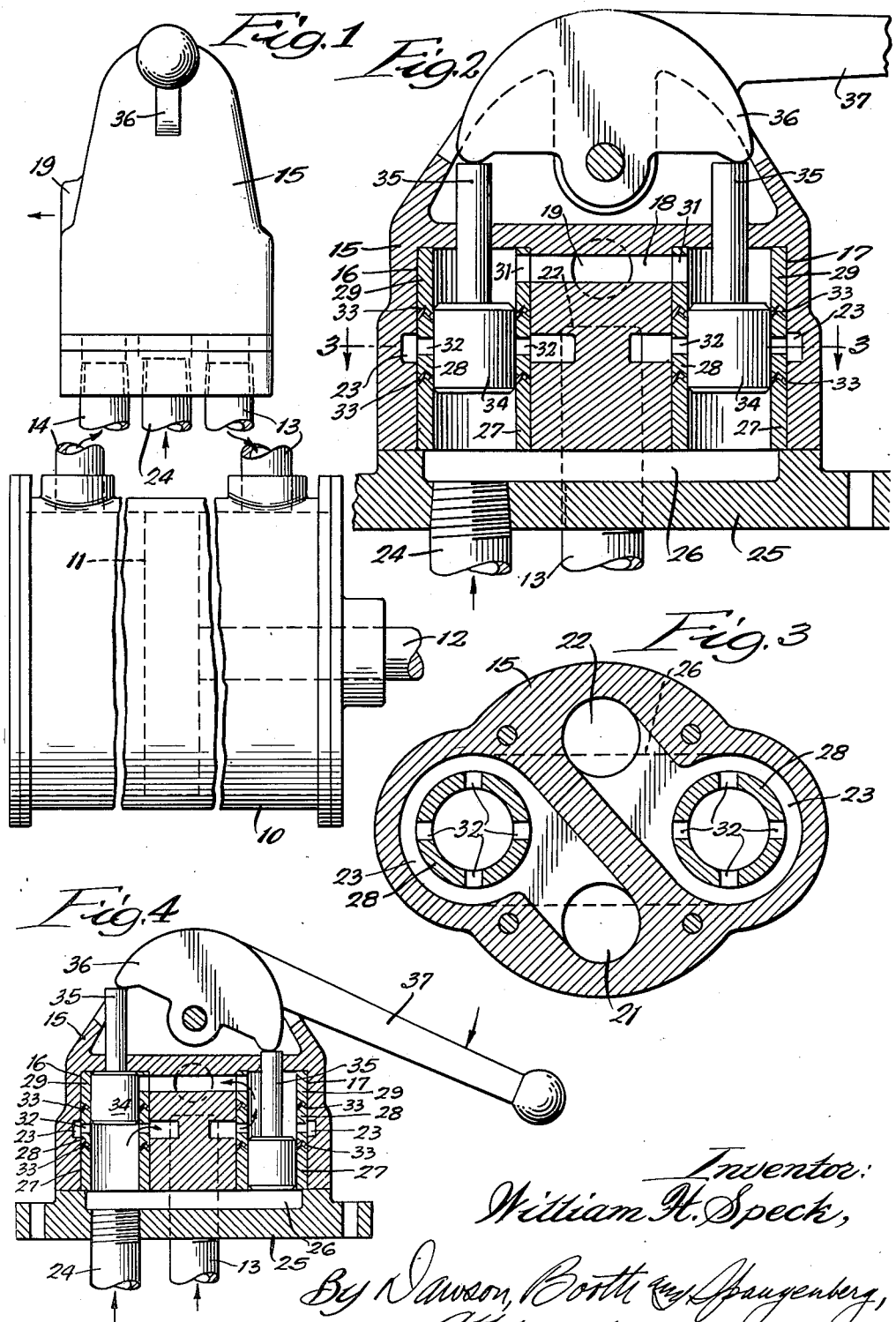
Inventor:
William H. Speck,
By Dawson, Booth and Spangenberg,
Attorneys.

Patented Apr. 8, 1952

2,592,352

UNITED STATES PATENT OFFICE 2,592,352

VALVE

William H. Speck, Chicago, Ill., assignor to Lindberg Engineering Company, Chicago, Ill., a corporation of Illinois Application May 2, 1946, Serial No. 666,710

3 Claims. (Cl. 251—76)

This invention relates to valves and more particularly to piston type control valves. As heretofore constructed piston type valves have usually included a piston slidable in a bore having one or more lateral ports therein. The pistons have carried packings at least adjacent their ends to seal against the bore. As the piston is moved from one control position to another, the packings cross the ports so that fluid flows directly between the edges of the packing and ports. This causes the packings to wear rapidly so that they must be replaced frequently, and for this purpose it is necessary to disassemble subtantially the entire valve construction.

It is one of the objects of the present invention to provide a valve in which the packings are substantially unaffected by flowing fluid.

Another object is to provide a valve in which the packings are carried in the bore on opposite sides of a port therein to engage the piston. With this construction a solid piston may be used, and flow during throttling is always between the edges of the piston and the ports so that the packings are undamaged.

Still another object is to provide a valve in which the piston slides in aligned sleeves fitting in the bore and between which packing rings are supported.

A further object is to provide a valve in which the sleeves and packings are held in place in the valve body by a cover plate on the body. With this construction the sleeves, the packings and the pistons can easily be removed and replaced simply by removing the cover plate.

The above and other objects and advantages of the invention will be more readily apparent from the following description when read in connection with the accompanying drawing, in which:

Figure 1 is an end elevation of a valve embodying the invention illustrating diagrammatically its connection to a cylinder to be controlled;

Figure 2 is a central longitudinal section through the valve;

Figure 3 is a horizontal section on the line 3—3 of Figure 2; and

Figure 4 is a section similar to Figure 2 showing an alternative position.

The valve as illustrated is adapted to control flow of air under pressure to a cylinder and discharge of air from the cylinder to regulate movements of a piston in the cylinder. As shown in Figure 1, the cylinder is indicated at 10 and has a piston 11 therein connected to a piston rod 12 which may extend through one end of the piston to connect to any desired part which is to be moved. Fluid connections indicated at 13 and 14 connect to opposite ends of the cylinder so that by regulating the admission and exhaust of air through the connections 13 and 14 movements of the piston in the cylinder can be controlled.

The valve comprises a main body 15 which may be a casting and which is formed adjacent its ends with cylindrical bores 16 and 17. The bores 16 and 17 open at one face of the body shown as its lower face and are closed at their opposite ends. An exhaust passage 18 formed in the body communicates with the upper ends of the bores and with an exhaust opening in a boss 19 on the side of the body. In case fluids other than air are employed which it is not desired to exhaust to atmosphere, an exhaust conduit may be connected to the boss 19 and may lead to any desired point.

The body is formed at its opposite sides centrally of the bores 16 and 17 with passages 21 and 22 which communicate respectively with the conduits 14 and 13. The passages 21 and 22 connect respectively with annular port openings 23 formed in the body intermediate the ends of the bores 16 and 17. Fluid is supplied to the body through a supply conduit 24 leading from any desired source of pressure and connecting to a cover plate 25 which is detachably secured to the bottom of the body. The cover plate is formed with a passage 26 communicating with the lower ends of both of the bores 16 and 17.

Each of the bores 16 and 17 is adapted to receive three aligned sleeves 27, 28 and 29. The uppermost sleeve 29 of each set is adapted to seat against the closed end of the its bore and is formed with one or more openings 31 to communicate with the exhaust passage 18. Each of the central sleeves 28 is formed with one or more port openings 32 registering with the annular ports 23 in the body. Preferably the edges of the sleeves are formed of a complementary V section to interfit with each other, and their length is such that when assembled the lower edge of the outer sleeve 27 will lie flush with the lower edge of the body. The sleeves fit slidably within the bores and are held in place therein by engagement with the cover plate 25.

Between each adjacent pair of sleeves there is mounted according to the invention an annular packing ring 33. The packing rings 33 may conveniently be the usual chevron packings formed of soft rubber or the like, V shaped in section to interfit with the edges of the sleeves.

It will be noted that a packing ring lies on each side of each of the ports 32 when the parts are assembled.

Flow of fluid between the several ports is controlled by pistons 34 having a close sliding fit in the sleeves and of a length slightly greater than the central sleeves 28. In this way when the pistons are in their central positions as shown in Figure 1 they will engage the packing rings 33 on opposite sides of the ports 32 effectively to seal the ports 32 from the inlet and discharge ports at the ends of the sleeves. The pistons are controlled by reduced piston rods 35 connected therewith and extending upwardly through suitable openings in the closed ends of the bores. The piston rods are engaged by the opposite end portions of a control member 36 pivoted at 37 to the body between the piston rods. The control member 36 may be operated by a handle 37 projecting therefrom through a slot in the upper part of the valve body.

In operation with the parts in the position shown in Figure 2 the ports 32 are both closed off so that there can be no flow of fluid to or from either end of the cylinder 10. To cause a movement of the piston 11 in the cylinder 10 the handle 37 may be rocked in one direction or the other as, for example, in a downward direction as shown in Figure 4. This operation will move the piston 34 at the right of the valve down and will permit the other piston 34 to rise in response to the pressure on the lower surface thereof. At this time fluid entering through the inlet conduit 24 may flow up through the bore 16 and through the ports 32 and 23 at the left of the valve out through the passage 21 into the left end of the cylinder 10. At the same time fluid from the right end of the cylinder 10 may flow through the conduit 13, passage 22, ports 23 and 32 and exhaust passage 18 to exhaust.

It will be noted that with the valve of the present invention the control pistons 34 are always in engagement with at least one of the packing rings and that there is never any direct flow of fluid across the packing rings which might tend to damage them. As the pistons are moved the packing rings remain fixed and any throttling in operation of the valve is caused by flow between the edges of ports 32 and the edges of the pistons. The pistons are preferably rounded or chamfered at their ends as shown to slide more easily over the packings. In the event it should be necessary to replace the packings, the sleeves or the pistons, it is only necessary to remove the cover plate 25 at which time the sleeves, packings and pistons can easily be removed from the bores.

While one embodiment of the invention has been shown and described in detail, it will be understood that this is illustrative only and is not to be taken as a definition of the scope of the invention, reference being had for this purpose to the appended claims.

What is claimed is:

1. A valve comprising a body formed with an elongated bore having a pressure inlet connection at one end, a pressure outlet connection at its other end and a lateral port in its central portion, three aligned sleeves fitting in the bore with a port opening in the central sleeve registering with said lateral port, annular packing rings fitting between the sleeves and exposed at the inner surfaces thereof, a piston defining an imperforate cylinder of greater length than the axial distance between the packing rings and disposed within said sleeves for sliding movements, the piston having a close sliding fit in the sleeves and with the exposed surfaces of the packings, a piston rod of reduced diameter connected to the piston and extending through the outlet connection end of the bore, and means pressing on the piston rod to control the position of the piston.

2. A valve comprising a body formed with a bore open at one end and closed at the other, three aligned sleeves fitting into the bore, the center sleeve having a port opening therein, annular packing rings between the sleeves exposed at the inner surface thereof, a piston defining an imperforate cylinder and slidable in the bore and having a reduced piston rod extending through the closed end of the bore, and a cover secured to the body over the open end of the bore and engaging the adjacent sleeve to hold the sleeves and packings in place in the bore the piston having a close sliding fit in the sleeves and with the exposed surfaces of the packings.

3. A valve comprising a body formed with an elongated bore having axially spaced fluid connections, three aligned sleeves fixedly disposed in said bore with a port opening in the central sleeve registering with one of said connections, annular packing rings fitting between the sleeves and exposed at the inner surfaces thereof, and a piston defining an imperforate cylinder of axial length exceeding the axial distance between said packing rings shiftably disposed within said sleeves and having a close sliding fit with the inner surfaces of the sleeves and the exposed surfaces of the packing rings.

WILLIAM H. SPECK.

REFERENCES CITED

The following references are of record in the file of this patent:

UNITED STATES PATENTS

| Number | Name | Date |
|---|---|---|
| 453,017 | May | May 26, 1891 |
| 963,314 | Nolan | July 5, 1910 |
| 965,270 | Zelle | July 26, 1910 |
| 1,016,167 | McCulloch | Jan. 30, 1912 |
| 1,992,732 | Barrett | Feg. 26, 1935 |
| 2,299,719 | Frimel | Oct. 20, 1942 |
| 2,393,805 | Parker | Jan. 29, 1946 |
| 2,396,643 | De Ganahl | Mar. 19, 1946 |

FOREIGN PATENTS

| Number | Country | Date |
|---|---|---|
| 372,876 | Great Britain | May 19, 1932 |